United States Patent
Esfahany (10) Patent No.: US 7,340,598 B2
(45) Date of Patent: Mar. 4, 2008

(54) METHOD AND SYSTEM FOR MONITORING A COMPUTER SYSTEM FOR DYNAMIC RECONFIGURATION

(75) Inventor: Kouros H. Esfahany, Huntington, NY (US)

(73) Assignee: Computer Associates Think, Inc., Islandia, NY (US)

( * ) Notice: Subject to any disclaimer, the term of this patent is extended or adjusted under 35 U.S.C. 154(b) by 452 days.

(21) Appl. No.: 10/888,373

(22) Filed: Jul. 9, 2004

(65) Prior Publication Data

US 2005/0038989 A1    Feb. 17, 2005

Related U.S. Application Data

(60) Provisional application No. 60/486,829, filed on Jul. 11, 2003.

(51) Int. Cl.
*G06F 9/00* (2006.01)
*G06F 15/177* (2006.01)

(52) U.S. Cl. .............. 713/100; 713/1; 713/2; 710/104; 710/310; 709/220; 709/221; 709/222

(58) Field of Classification Search ............ 713/1, 713/2, 100; 710/104, 310
See application file for complete search history.

(56) References Cited

U.S. PATENT DOCUMENTS

| | | | |
|---|---|---|---|
| 5,386,567 A * | 1/1995 | Lien et al. ............... | 713/100 |
| 5,905,867 A * | 5/1999 | Giorgio ................... | 709/224 |
| 6,182,022 B1 * | 1/2001 | Mayle et al. ............ | 702/182 |
| 6,205,503 B1 * | 3/2001 | Mahalingam ........... | 710/302 |
| 6,243,773 B1 * | 6/2001 | Mahalingam ........... | 710/302 |
| 6,263,387 B1 * | 7/2001 | Chrabaszcz ............. | 710/302 |
| 6,378,069 B1 * | 4/2002 | Sandler et al. .......... | 713/153 |
| 6,898,686 B1 * | 5/2005 | Perez ...................... | 711/170 |
| 6,973,447 B1 * | 12/2005 | Aguilar et al. .......... | 707/1 |
| 7,064,577 B1 * | 6/2006 | Lee ......................... | 326/38 |

* cited by examiner

*Primary Examiner*—Nitin C. Patel
(74) *Attorney, Agent, or Firm*—Baker Botts L.L.P.

(57) ABSTRACT

A method of monitoring a computer system for reconfiguration includes defining at least one platform on the computer system, monitoring the platform to gather information related to multiple predefined attributes, analyzing the information related to the multiple predefined attributes based on predetermined threshold values and reconfiguring the platform bases on a result of the analysis. A system for monitoring a computer system for reconfiguration includes a platform defining device adapted to define at least one platform on the computer system, a monitoring device adapted to monitor the platform to gather information related to multiple predetermine attributes an analysis device adapted to analyze the information related to the multiple predetermined attributes based on predetermined threshold values and a reconfiguration device adapted to reconfigure the platform in accordance with a result from the analysis device.

54 Claims, 4 Drawing Sheets

METHOD AND SYSTEM FOR MONITORING A COMPUTER SYSTEM FOR DYNAMIC RECONFIGURATION

REFERENCE TO RELATED APPLICATIONS

The present specification is based on Provisional Application 60/486,829 filed Jul. 11, 2003, the entire contents of which are herein incorporated by reference.

BACKGROUND

1. Field of the Disclosure

The present disclosure relates to a method and system of reconfiguring a computer system. More particularly the present disclosure relates to a method and system for monitoring a computer system for dynamic reconfiguration.

2. Related Art

A recent trend in the manufacture of computer hardware is to allow for the dynamic addition/removal of resources such as CPU resources and Memory resources. Such dynamic addition/removal of resources is generally referred to as dynamic reconfiguration and is generally considered a function of system management. This capability at the hardware level, however, does not provide any intelligent method to allow users to detect the need for additional resources. That is, while the hardware is capable of supporting dynamic reconfiguration, there is no methodology in place to determine when adding/removing resources is advisable.

Most hardware vendors recommend a basic batch processing method to address the addition/removal of resources. At least one major software vendor has provided a method utilizing a measure based on CPU usage. However, measuring simply the CPU usage is not sufficient where, for example, lack of memory is likely to be a limiting factor in the performance of the system Accordingly, it would be desirable to provide a method for monitoring a computer system for reconfiguration that avoids the problems identified above.

SUMMARY OF THE DISCLOSURE

A method of monitoring a computer system for reconfiguration includes identifying at least one platform on the computer system, monitoring the platform to gather information related to multiple predefined attributes, analyzing the information related to the multiple predefined attributes based on predetermined threshold values and reconfiguring the platform based on a result of the analysis.

A system for monitoring a computer system for reconfiguration includes a platform identifying device adapted to identify at least one platform on the computer system, a monitoring device adapted to monitor the platform to gather information related to multiple predetermined attributes, an analysis device adapted to analyze the information related to the multiple predetermined attributes based on predetermined threshold values and a reconfiguration device adapted to reconfigure the platform in accordance with a result from the analysis device.

A computer system includes a processor and a program storage device readable by the computer system, embodying a program of instructions executable by the processor to perform method steps for monitoring a computer system for reconfiguration. The method steps include identifying at least one platform on the computer system, monitoring the platform to gather information related to multiple predetermined attributes, analyzing the information related to the multiple predetermined attributes to determine a status of the platform and reconfiguring the platform based on a result of the analyzing step.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

The method and system of the present disclosure enable a user to define, based on multiple criteria, how resources should be used. This approach enables the user to closely define computation requirements based on their business needs.

The method and system of the present disclosure provide for the convenient management of high-end servers and is preferably usable with hardware from multiple hardware vendors such as SUN, IBM, HP, and Fujitsu-Siemens which manufacture hardware capable of dynamic reconfiguration. The user has the ability to define a proper system utilization window based on CPU resources, memory resources, and load average relevant to the needs of the user, or the business model of the enterprise. Based on the given criteria, the method and system of the present disclosure continuously adjust and balance the resource utilization across the entire system.

Using agent technology and authentication/encryption algorithms, the method and system discover, monitor, and manage dynamically reconfigurable high-end servers. Dynamic programming techniques may detect possible peak scenarios of resource utilizations based on given criteria. The given criteria are preferably based on a weighted combination of CPU usage, Memory usage, and Load Average on each system.

The system and method may be implemented in the form of a software application running on a computer system such as a mainframe, personal computer (PC), handheld computer, server, etc. The computer system may be linked to a database or various types of storage media. The link may be, for example, via a direct link such as a direct hard wire or wireless connection, via a network connection such as a local area network, or via the Internet.

Figure 1:
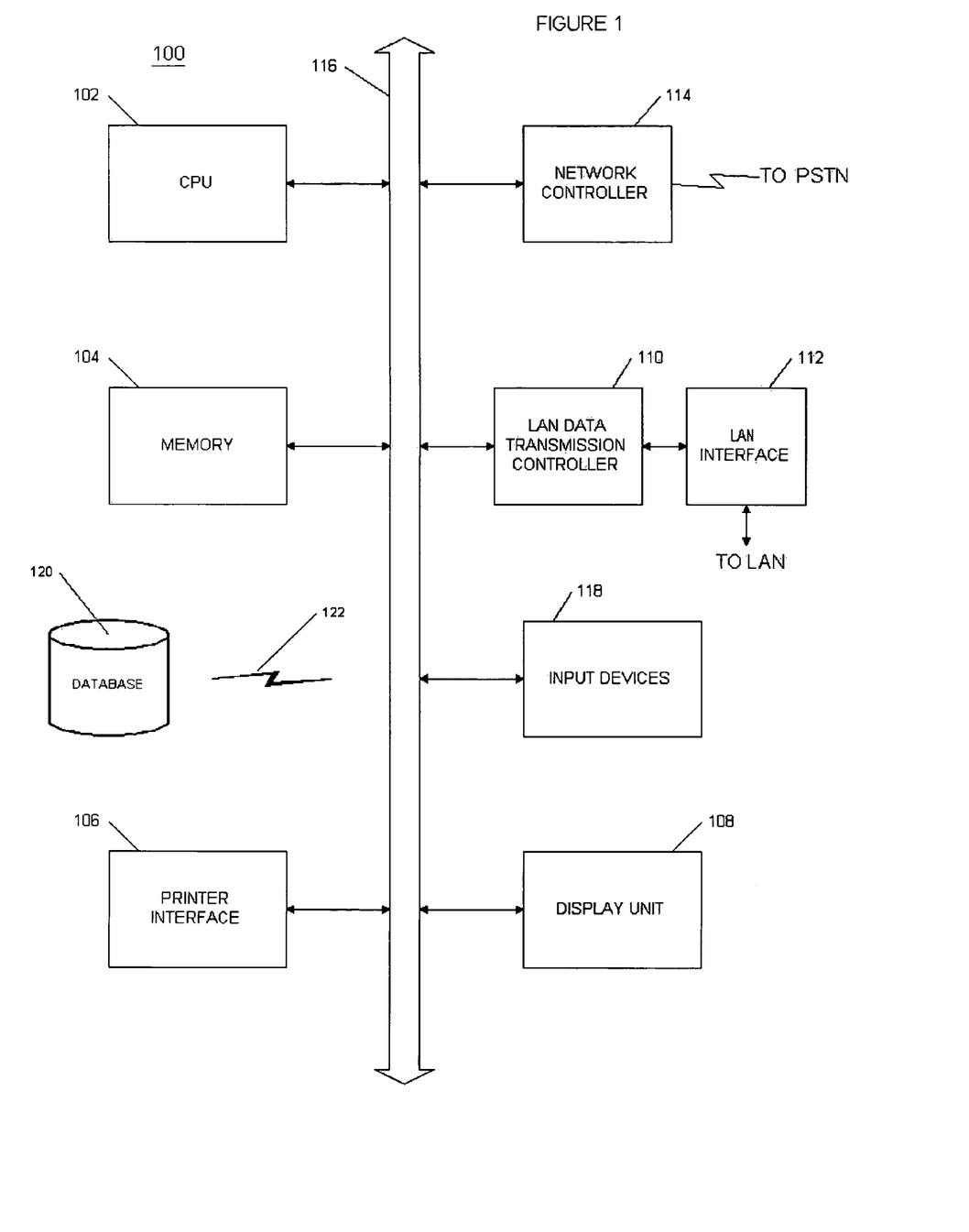
FIG. 1 is an illustration of a computer system for implementing a method and system according to the present disclosure.

An example of a computer system capable of implementing the present system and method is shown in FIG. 1. The computer system referred to generally as system 100 may include a central processing unit (CPU) 102, memory 104, a printer interface 106, a display unit 108, a LAN (local area network) data transmission controller 110, a LAN interface 112, a network controller 114, an internal bus 116, a database 120 and one or more input devices 118 such as, for example, a keyboard, mouse, etc. Naturally, other components may be included in the computer system 100 and some components may not be present.

Figure 2:
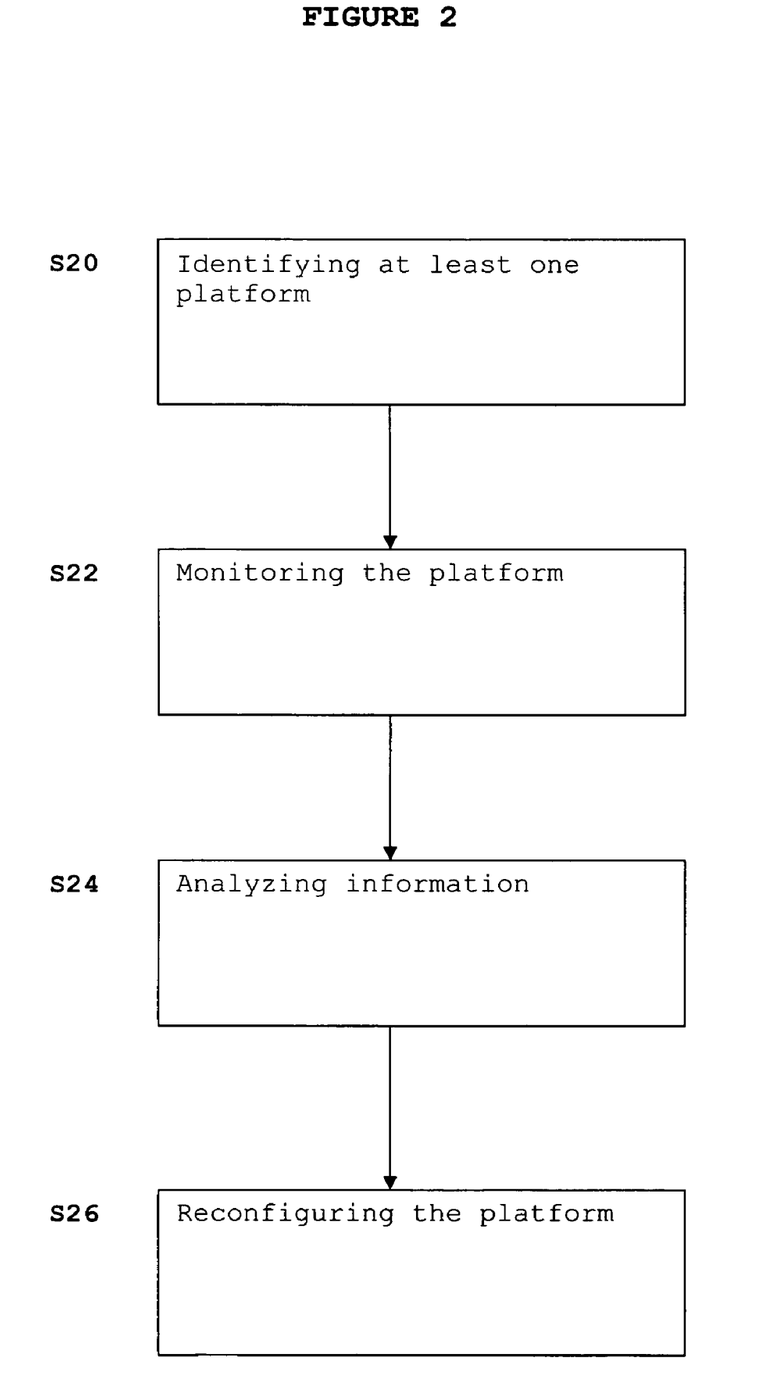
FIG. 2 is a flow chart illustrating a method of monitoring a computer system for reconfiguration according to an embodiment of the present disclosure.

A method of monitoring a computer system for reconfiguration is illustrated in FIG. 2. In step S20, at least one platform of the computer system is identified. In step S22, the platform is monitored to gather information related to multiple predefined attributes. At step S24, the information gathered related to the multiple predefined attributes is analyzed based on predefined threshold values. At step S26 reconfiguration of the platform is performed to add and/or remove resources from the platform based on a result of the analysis.

At step S20, a platform of the computer system is identified, or discovered. In the present disclosure, the computer system is generally a high-end server. It is noted that the computer system may include several platforms, and each platform may be discovered or identified separately. For the sake of clarity, the present method is described relative to one discovered platform, however, it is noted that step S20 may be utilized to discover all platforms on the computer system. A platform is a collection of one or more domains. Each domain is a collection of one or more system boards with its own instance of an operating system, hosted and boot disk, and its own network connection, memory and disk space. In a preferred embodiment, each domain in the discovered platform and each system board included in each domain may also be identified in step S20. In addition, each platform, each domain of each platform and each system board of each identified domain are preferably represented to the user on a display of the computer system.

The platform identified in step S20 is then monitored for performance in step S22.

Preferably, each domain of the identified platform is monitored is step S22. More specifically, the performance of the platform, domain and/or system board is monitored to provide information related to the predetermined criteria. In a preferred embodiment, the predetermined criteria include real memory usage, CPU usage and load average. A CPU attribute value is provided based on the percentage of CPU resources in use by the platform, domain and/or system board. A real memory attribute value, or memory attribute value, is generated based on the percentage of available real memory resources in use in platform, domain and/or system board. A load average attribute value is generated base on the load average of the platform, domain, and/or system board. These attribute values are included in the monitoring information. Preferably, the monitoring information is gathered using agents commonly incorporated in computer system management software. In a preferred embodiment, the monitoring information is provided periodically to consistently monitor performance of the computer system. A poll interval may be provided to determine the period of time between collections of information in the monitoring step S22. Preferably, this poll interval is set by a system administrator of the computer system who is also typically the user of the method.

The monitoring information collected in step S22 is analyzed in step S24. In this analysis step S24, the status of the platform, domain and/or system board is determined. More specifically, since a platform is a collection of domains, the status of each domain in the identified platform is determined. A domain that is using substantially all of its available CPU or memory resources, for example, may be unable to accommodate even a small increase in activity without affecting performance. In such a case, it may be preferable to reconfigure the domain, and thus the platform, in step S26. Similarly, where a domain is operating well below capacity, the resources of the domain, and thus the platform, may be used more effectively by another domain that is in need of additional resources. The analysis of the monitoring information in step S24 will be used to determine the status of the domain. Based on the status, the domain may be reconfigured to add resources, or to remove resources that are not being fully utilized, thus freeing up resources for use by a platform or domain that is in need of additional resources.

The analysis in step S24 is based on the CPU attribute value, the memory attribute value and the load average attribute value. More specifically, since attribute values are provided periodically, the analysis is preferably based on several successive attribute values. Depending on the computer system, one or more of these attributes may be more important or relevant than the others. Thus, it may be preferable to provide weight coefficients for these criteria, or attributes, during the analyzing step S24. That is, in determining the status of the domain, certain attributes may be more relevant, and thus weight coefficients may be assigned to weight the analyses appropriately. For example, the CPU attribute value may be weighted more heavily than load average attribute value in the analysis step S24. Weight coefficients may be provided by the user/administrator of the method as desired. Preferably, a CPU weight coefficient ($K_{CPU}$), a memory, or real memory, weight coefficient ($K_{RM}$) and a load average weight coefficient ($K_{LA}$) are provided by the user.

The status of the domain is preferably determine regularly, such that the computer system can be kept running efficiently. An analysis interval may be provided to set a period of time between successive determinations of status of the domain. Preferably the analysis interval is longer than the poll interval discussed above, such that analysis can be performed based on at least one, and preferably multiple samples of the attribute values included in the monitoring information. A critical threshold may be provided for each attribute to indicate a maximum value of that attribute value above which the criteria may be considered critical. Preferably a critical CPU attribute value ($C_{crit}$), a critical memory attribute value ($M_{crit}$) and a critical load average attribute value ($L_{crit}$) are provided by the user.

In the analyzing step S24, the present status of a domain is determined based on the weighted sum of the attribute values. More specifically, the current status (DS) of a domain may be represented by the following equation:

$$DS_i = \left[\left(\sum_{j=1}^{n} K_{cpu} C_{ij}/C_{crit} + \sum_{j=1}^{n} K_{rm} M_{ij}/M_{crit} + \sum_{j=1}^{n} K_{la} L_{ij}/L_{crit}\right)\right] / N * n$$

Where: i—number of the domain j—number of collections of i-th domain $K_{cpu}$—weight coefficient for CPU usage, the CPU attribute value $K_{rm}$—weight coefficient for Memory usage, the memory attribute value $K_{la}$—weight coefficient for Load Average, the load average attribute value $C_{ij}$—current CPU attribute value $M_{ij}$—current memory attribute value $L_{ij}$—current Load Average attribute value $C_{crit}$—critical value for CPU usage $M_{crit}$—critical value for memory usage $L_{crit}$—critical value for load average N—number of attributes monitored n—the number of collections of monitoring information (Analysis Interval/Poll Interval)

The relative status of the domain (RDS) as a whole is determined by:

$$RDS = DS_j / CDS$$

Where CDS is the critical domain status value.

The user/administrator preferably provides the CDS as an indication of a threshold value above which the domain as a whole is considered critical. When the RDS is less than 1, that is when the domain status value, DS, is less than the critical domain status value, CDS, the domain is not critical. Otherwise, the domain is critical and reconfiguration may be appropriate. While the present example has described determining whether a single domain is critical, it is noted that several domains may be present on a platform and several platforms may be present in a system. The method of the present disclosure may be applied to multiple platforms and to multiple domains of each platform to ensure efficient operation of the system as a whole.

Similarly, a domain may be underutilized. When the relative domain status (RDS) is less than a minimum domain status value (MDS), also preferably provided by the user/administrator, divided by the critical domain status, the domain is being underutilized. In this case, reconfiguration may also be warranted, except that reconfiguration will be effected to remove one or more system boards from the underutilized domain.

In a preferred embodiment the user is notified that a domain is critical, preferably via the display of the computer system. The user may then manually reconfigure the domain as described further herein below.

Reconfiguration in step S26 typically involves adding resources to a critical domain, which is a domain in which the domain status value (DS) is larger than the critical domain status value (CDS). More specifically, reconfiguration involves adding a system board to the critical domain. As noted above, many hardware manufacturers have incorporated the ability to add and subtract system boards to domains in their hardware for their high end servers. In a preferred embodiment, reconfiguration is performed automatically, without the need for user/administrator interference. However, there may be situations in which the user/administrator may wish to direct the reconfiguration and thus the method and system of the present disclosure allows users to manually reconfigure as well in step S26. Practically speaking, adding resources entails connecting system boards to the critical domain. The system board that is added to a critical domain may be a free system board, that is, a system board that is not being used by another domain. However, where there is no such free system board available, a system board from any non-critical domain may be disconnected from the non-critical domain and connected to the critical domain. A non-critical domain is a domain in which the domains status value DS is less than the critical domain status value (CDS) such that the RDS is less than 1.

Figure 4:
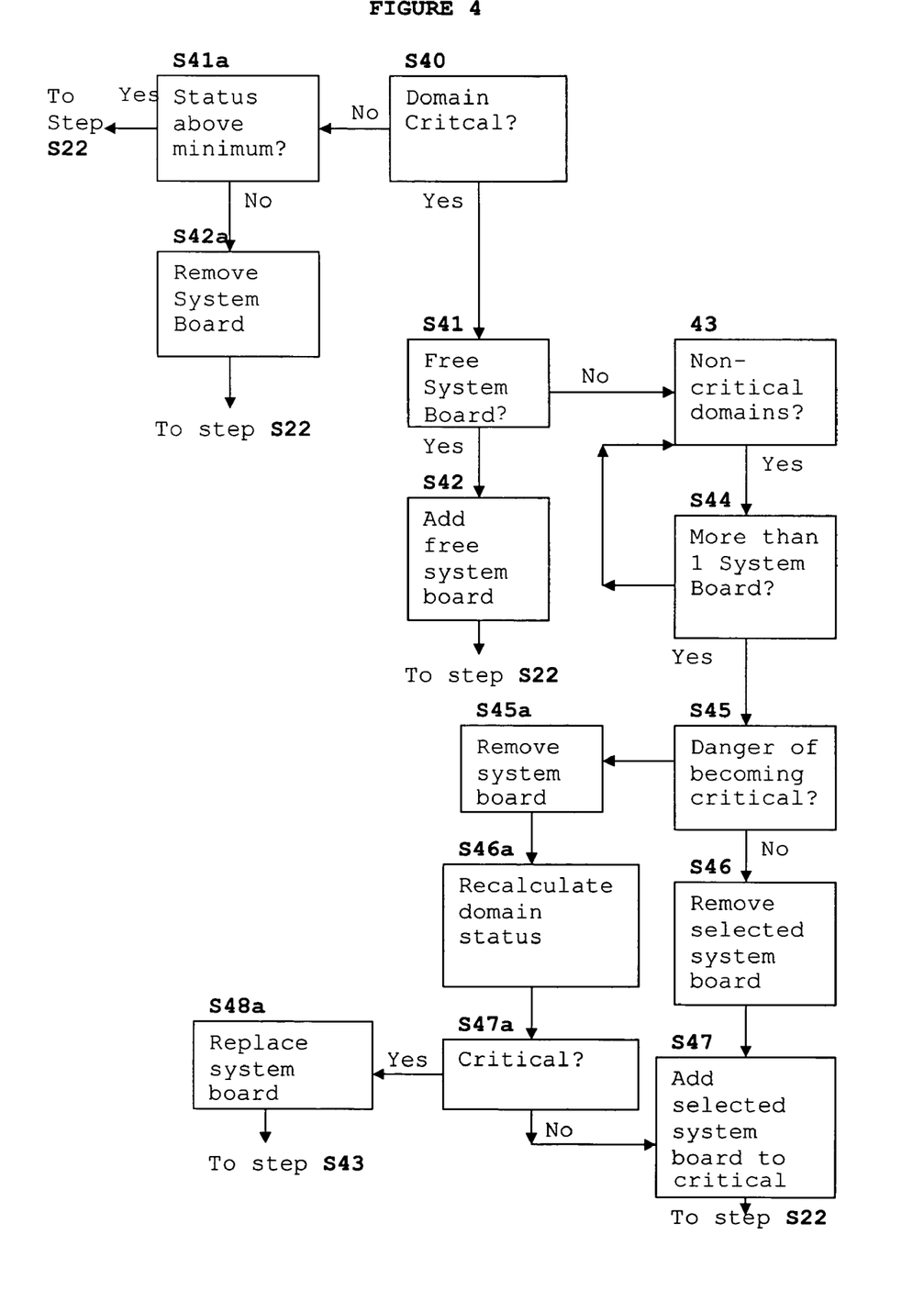
FIG. 4 is a flow chart illustrating a step of reconfiguring a computer system according to an embodiment of the present disclosure.

The reconfiguration step S26 is described in further detail with reference to FIG. 4. At step S40, a determination is made as to whether the domain is critical. If so ("Yes" at step S40) a determination is made as to whether the there are any free system boards at step S41. If so ("Yes" at step S41), one of the free system boards is added to the critical domain at step S42. The addition of the free system board will ordinarily relieve stress on the domain. Thereafter, the method may return to step S22 where the domain is monitored as described above.

If the domain is not critical ("No" at step S40), at step S41a, a determination is made as to whether the domain status value (DS) is greater than a Minimum Domain Status value (MDS). If so ("Yes" at step S41a), the method may return to step S22 to continue monitoring the domain. If the domain status values is less than the MDS ("No" at step S41a), at step S42a, a system board is removed from the domain. Since the resources of the domain are being underused, the system board may be removed with little danger of becoming critical. The removed system board may remain a free system board or may be added to a critical domain in need of additional resources. After removing the system board, the method may return to step S22 where the domain is once again monitored as described above.

If there are no free system boards ("No" at step S40), at step S43, a determination is made as to whether any other domains are non-critical. More specifically, at step S43 a determination is made as to whether there are non-critical domains that also have a domain status value above the MDS. If so ("Yes" at step S43), at step S44, a determination is made as to whether more than one system board is present in the non-critical domain. Each domain preferably has at least one system board with a SCSI interface. A composition of system board should also preferably have sufficient memory to support an autonomous system and there should be at least one boot disk connected to one of the system boards of a domain. In addition, there should preferably be a network interface on at least one system board so that the domain can be booted from the network if there is no boot disk. Thus, there are certain limitations on what system boards can be removed from a domain and it is preferable not to remove a system board from a domain that only has one system board. Thus, if there is only one system board in a domain ("No" at step S44) the method returns to step S43 to determine if there another non-critical domain available.

If there is more than one system board on the non-critical domain ("Yes" at step S44), at step S45, a determination is made as to whether the non-critical domain is in danger of becoming critical. The removal of resources from a non-critical domain may result in the non-critical domain quickly becoming critical. Naturally, this is a situation that is preferably avoided. If there is a danger that the non-critical domain may become critical, that is where the domain status value is not substantially less than the CDS, ("Yes" at step S45), at step S45a, a system board is removed. At step S46a, the domain status is recalculated. At step 47a, a determination is made as to whether the non-critical domain has been made critical by removal of the system board. If so ("Yes" at step S47a), at step 48a, the system board is replaced. Thereafter, the method returns to step S43 to determine whether there is another non-critical domain. If the non-critical domain remains non-critical after removal of the system board, ("No" at step S47a), at step 47, the removed system board is added to the critical system board and then the method returns to step S22 to continue monitoring.

If there is no danger of the non-critical domain becoming critical ("No" at step S45), at step S46, a selected system board is removed from the non-critical domain. When the RDS is less than 0.5, the system board is selected based on the attribute values of the critical domain. For example, if the CPU attribute value of the critical domain is higher than the memory attribute value of the critical domain, the system board is selected such that the selected system board has maximum CPU resources. When the RDS of the non-critical domain is greater than 0.5, the system board is selected based on attribute values of the non-critical domain. For example, if the CPU attribute value of the non-critical domain is greater than the memory attribute value of the non-critical domain, the system board is selected for removal such that it has minimum CPU resources. In this manner, the danger of the non-critical domain becoming critical if further decreased. At step S47, the selected system board is added to the critical domain. Thereafter the method may return to step S22 for monitoring.

In a preferred embodiment of the present disclosure, the CPU attribute value, memory attribute value and load average attribute value of each domain and each system board are also presented to the user on the display. As noted above, the user may reconfigure the domain manually if desired. Thus it is beneficially to present the user with the attribute values of each domain and system board identified so that the manual adjustment will promote efficiency. Preferably, the user is able to select a domain to reconfigure and can disconnect and add system boards via a traditional graphic user interface (GUI), for example, using a computer mouse.

Figure 3:
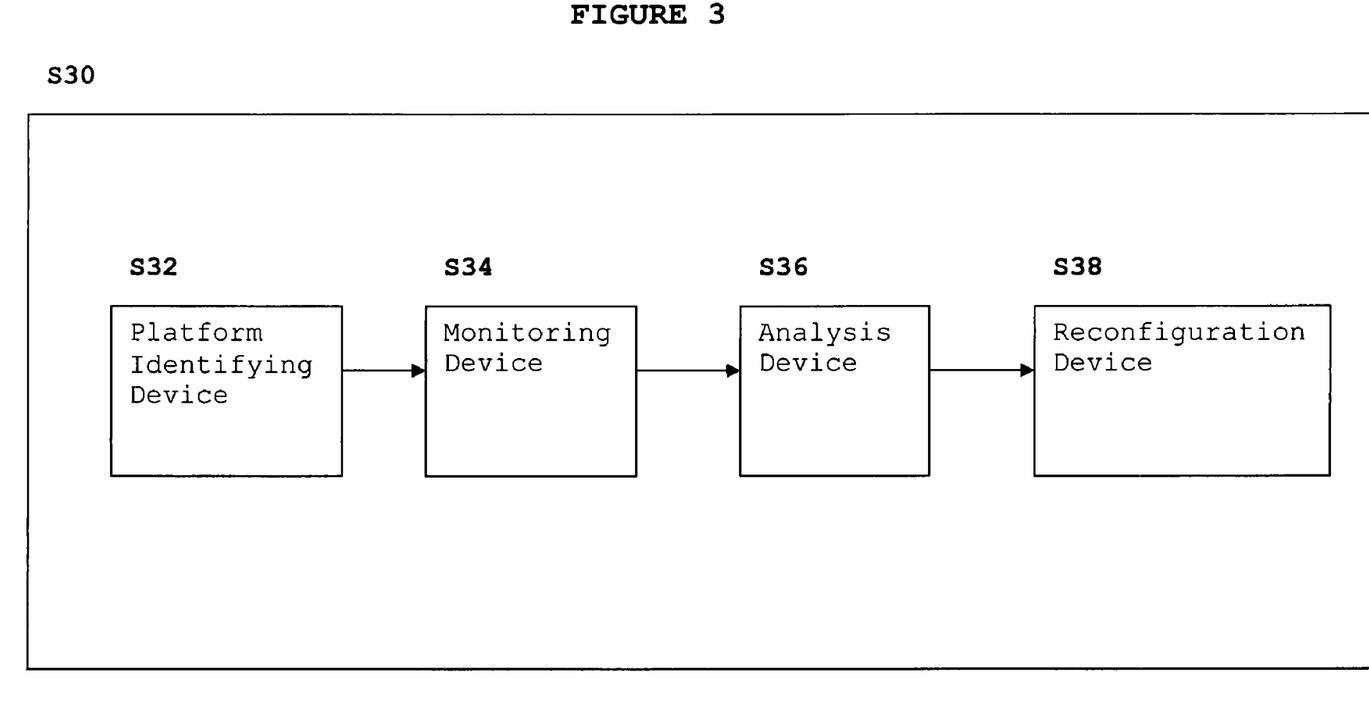
FIG. 3 is a block diagram illustrating a system for monitoring a computer system for reconfiguration according to an embodiment of the present disclosure.

A system 30 for monitoring a computer system for reconfiguration is described in further detail with reference to FIG. 3. A platform identifying device 32 is adapted to identify at least one platform on the system. A monitoring device 34 monitors the identified platform to gather information regarding predefined attributes of the platform. An analysis device 36 analyzes the information gathered by the monitoring device based on predefined threshold information. A reconfiguration device reconfigures the platform based on a result of the analysis performed in the analysis device 38.

The system described above is illustrated in FIG. 3 of the present disclosure. The system operates substantially in accordance with the method for monitoring a computer system for reconfiguration illustrated in FIG. 2 and FIG. 4 discussed above, and therefore will not be discussed in further detail herein.

The present disclosure may be conveniently implemented using one or more conventional general purpose digital computers and/or servers programmed according to the teachings of the present specification. Appropriate software coding can readily be prepared by skilled programmers based on the teachings of the present disclosure. The present disclosure may also be implemented by the preparation of application specific integrated circuits or by interconnecting an appropriate network of conventional components.

Numerous additional modifications and variations of the present disclosure are possible in view of the above-teachings. It is therefore to be understood that within the scope of the appended claims, the present invention may be practiced other than as specifically described herein.

Further details regarding the method and system of the present application are described in Exhibit A attached hereto and hereby incorporated by reference.

What is claimed is:

1. A method of monitoring a computer system for reconfiguration comprising:
   identifying at least one platform on the computer system;
   monitoring the platform to gather monitoring information related to multiple predetermined attributes selected from a group consisting of central processing unit (CPU) usage, memory usage and load average;
   analyzing the monitoring information related to the multiple predetermined attributes to determine a status of the platform; and
   determining whether the platform is to be reconfigured based on a result of the analyzing step.

2. The method of claim 1, wherein the identifying step further comprises:
   identifying at least one domain of the identified platform; and
   identifying at least one system board of the at least one domain.

3. The method of claim 2, wherein the predetermined attributes include the central processing unit (CPU) usage, the memory usage and the load average.

4. The method of claim 3, wherein the monitoring step further comprises:
   monitoring the predetermined attributes of the at least one domain; and
   monitoring the predetermined attributes of the at least one system board.

5. The method of claim 4, wherein the monitoring step further comprises:
   providing monitoring information including a CPU attribute value related to CPU usage, a memory attribute value related to memory usage and a load average attribute value related to the load average of the domain and of the system board.

6. The method of claim 5, wherein the monitoring step further comprises:
   periodically providing the CPU attribute value related to CPU usage of the domain, the memory attribute value related to memory usage of the domain and the load average attribute value related to the load average of the domain based on a poll interval indicating a period of time that passes between providing the attribute values.

7. The method of claim 6, wherein the analyzing step further comprises determining a status for the domain and providing a domain status value indicating the status of the domain.

8. The method of claim 7, wherein the domain status value of the domain is based on the CPU attribute value, the memory attribute value and the load average attribute value.

9. The method of claim 8, wherein the domain status value of the domain is based on a weighting of the CPU attribute value, the memory attribute value and load average attribute value, wherein a weighting coefficient is provided for each of the CPU usage attribute value, memory usage attribute value and load average attribute value.

10. The method of claim 9, wherein the status of the domain is critical when the domain status value is greater than a predetermined critical domain status value.

11. The method of claim 10, wherein the status of the domain is determined periodically based on an analysis interval indicating a period of time between successive instances of determining the status of the domain.

12. The method of claim 11, further comprising reconfiguring the platform, wherein the reconfiguring step further comprises:
   adding resources to the domain when the status of the domain is critical; and removing resources from the domain when the domain status value is below a predetermined minimum domain status value.

13. The method of claim 12, wherein the adding step further comprises:
locating a free system board; and
adding the free system board to the domain.

14. The method of claim 12, wherein the adding step further comprises:
identifying a second domain with a domain status value that is less than the critical domain status value and includes more than one system board;
selecting a system board from the second domain for removal from the second domain; and
adding the selected system board to the domain.

15. The method of claim 14, wherein the selecting step further comprises:
selecting the system board from the second domain based on the CPU attribute value, the memory attribute value and the load average attribute value of the domain, such that the selected system board is selected to provide maximum resources for a highest attribute value, when the domain status value of the second domain is less than a predetermined safety value.

16. The method of claim 15, wherein the selecting step further comprises:
selecting the system board from the second domain based on the CPU attribute value, the memory attribute value and the load average attribute value of the second domain, such that the selected system board is selected to remove minimum resources for the attribute with a highest value, when the domain status value of the second domain is greater than a predetermined safety value.

17. The method of claim 16, wherein the CPU attribute value, the memory attribute value and the load average attribute value for each system board and domain of the identified platform are displayed to a user on a display of the computer system.

18. The method of claim 17, wherein the user selects the selected system board and adds the selected system board to the domain.

19. A computer system comprising:
a processor; and
a program storage device readable by the computer system, embodying a program of instructions executable by the processor to perform method steps for monitoring a computer system for reconfiguration, the method steps comprising:
identifying at least one platform on the computer system;
monitoring the platform to gather monitoring information related to multiple predetermined attributes selected from a group consisiting of processing unit (CPU) usage, memory usage and load average;
analyzing the monitoring information related to the multiple predetermined attributes to determine a status of the platform; and
determining whether the platform is to be reconfigured based on a result of the analyzing step.

20. The computer system of claim 19, wherein the identifying step further comprises:
identifying at least one domain of the identified platform; and
identifying at least one system board of the at least one domain.

21. The computer system of claim 20, wherein the predetermined attributes include the central processing unit (CPU) usage, the memory usage and the load average.

22. The computer system of claim 21, wherein the monitoring step further comprises:
monitoring the predetermined attributes of the at least one domain; and
monitoring the predetermined attributes of the at least one system board.

23. The computer system of claim 22, wherein the monitoring step further comprises:
providing monitoring information including a CPU attribute value related to CPU usage, a memory attribute value related to memory usage and a load average attribute value related to the load average of the domain and of the system board.

24. The computer system of claim 23, wherein the monitoring step further comprises:
periodically providing the CPU attribute value related to CPU usage of the domain, the memory attribute value related to memory usage of the domain and the load average attribute value related to the load average of the domain based on a poll interval indicating a period of time that passes between providing the attribute values.

25. The computer system of claim 24, wherein the analyzing step further comprises determining a status for the domain and providing a domain status value indicating the status of the domain.

26. The computer system of claim 25, wherein the domain status value is based on the CPU attribute value, the memory attribute value and the load average attribute value.

27. The computer system of claim 26, wherein the domain status value is based on a weighting of the CPU attribute value, the memory attribute value and the load average attribute value, wherein a weighting coefficient is provided for each of the CPU attribute value, the memory attribute value and the load average attribute value.

28. The computer system of claim 27, wherein the status of the domain is critical when the domain status value is greater than a predetermined critical domain status value.

29. The computer system of claim 28, wherein the status of the domain is determined periodically based on an analysis interval indicating a period of time between successive instances of determining the status of the domain.

30. The computer system of claim 29, wherein the method steps further comprise reconfiguring the platform, wherein the reconfiguring step further comprises:
adding resources to the domain when the status of the domain is critical; and removing resources from the domain when the domain status value is less than a predetermined minimum domain status value.

31. The computer system of claim 30, wherein the adding step further comprises:
locating a free system board; and
adding the free system board to the domain.

32. The computer system of claim 30, wherein the adding step further comprises:
identifying a second domain with a domain status value that is less than the critical domain status value and includes more than one system board;
selecting a system board from the second domain for removal from the second domain; and
adding the selected system board to the domain.

33. The computer system of claim 32, wherein the selecting step further comprises:

selecting the system board from the second domain based on the CPU attribute value, the memory attribute value and the load average attribute value of the domain, such that the selected system board is selected to provide maximum resources for a highest attribute value, when the domain status value of the second domain is less than a predetermined safety value.

34. The computer system of claim 33, wherein the selecting step further comprises:
selecting the system board from the second domain based on the CPU attribute value, the memory attribute value and the load average attribute value of the second domain, such that the selected system board is selected to remove minimum resources for the attribute with the highest value, when the domain status value of the second domain is greater than a predetermined safety value.

35. The computer system of claim 34, wherein the CPU attribute value, the memory attribute value and the load average attribute value for each system board and for each domain of the identified platform are displayed to a user on a display of the computer system.

36. The computer system of claim 35, wherein the user selects the selected system board and adds the selected system board to the domain.

37. A system for monitoring a computer system for reconfiguration comprises:
a platform identifying device adapted to define at least one platform on the computer system;
a monitoring device adapted to monitor the platform to gather monitoring information related to multiple predetermined attributes selected from a group consisting of central processing unit (CPU) usage, memory usage and load average;
an analysis device adapted to analyze the monitoring information related to the multiple predetermined attributes based on predetermined threshold values; and
a determination device adapted to determine whether the platform is to be reconfigured in accordance with a result from the analysis device.

38. The system of claim 37, wherein the platform identifying device identifies at least one domain of the identified platform and identifies at least one system board of the at least one domain.

39. The system of claim 38, wherein the predetermined attributes include the central processing unit (CPU) usage, the memory usage and the load average.

40. The system of claim 39, wherein the monitoring device monitors the predetermined attributes of the at least one domain and monitors the predetermined attributes of the at least one system board.

41. The system claim 40, wherein the monitoring device provides monitoring information including a CPU attribute value related to CPU usage, a memory attribute value related to memory usage and a load average attribute value related to the load average of the domain and of the system board.

42. The system of claim 41, wherein the monitoring device periodically provides the CPU attribute value related to CPU usage of the domain, the memory attribute value related to memory usage of the domain and the load average attribute value related to the load average of the domain based on a poll interval indicating a period of time that passes between providing the attribute values.

43. The system of claim 42, wherein the analysis device determines a status for the domain and provides a domain status value indicating the status of the domain.

44. The system of claim 43, wherein the domain status value of the domain is based on the CPU attribute value, the memory attribute value and the load average attribute value.

45. The system of claim 44, wherein the domain status value is based on a weighting of the CPU attribute value, the memory attribute value and the load average attribute value, and a weighting coefficient is provided for each of the CPU attribute value, the memory attribute value and the load average attribute value.

46. The system of claim 45, wherein the status of the domain is critical when the domain status value is greater than a predetermined critical domain status value.

47. The system of claim 46, wherein the status of the domain is determined periodically based on an analysis interval indicating a period of time between successive instances of determining the status of the domain.

48. The system of claim 47, further comprising a reconfiguring device adapted to reconfigure the platform, wherein the reconfiguring device adds resources to the domain when the status of the domain is critical and removes resources from the domain when the domain status value is below a predetermined minimum domain status value.

49. The system of claim 48, wherein the reconfiguring device locates a free system board and adds the free system board to the domain.

50. The system of claim 48, wherein the reconfiguring device identifies a second domain with a domain status value that is less than the critical domain status value and that includes more than one system board, selects a system board from the second domain for removal from the second domain and adds the selected system board to the domain.

51. The system of claim 50, wherein the reconfiguring device selects the system board from the second domain based on the CPU attribute value, the memory attribute value and the load average attribute value of the domain, such that the selected system board is selected to provide maximum resources for a highest attribute value, when the domain status value of the second domain is less than a predetermined safety value.

52. The system of claim 51, wherein the reconfiguring device selects the system board from the second domain based on the CPU attribute value, the memory attribute value and the load average attribute value of the second domain, such that the selected system board is selected to remove minimum resources for the attribute with the highest value, when the domain status value of the second domain is above a predetermined safety value.

53. The system of claim 52, further comprising a display device adapted to display information to a user, wherein the CPU attribute value, the memory attribute value and the load average attribute value for each system board and domain of the identified platform are displayed to the user.

54. The system of claim 53, wherein the reconfiguring device is adapted to allow the user to select the selected system board from the second domain and to add the selected system board to the domain.

* * * * *